(12) United States Patent
Caveney et al.

(10) Patent No.: US 6,484,367 B1
(45) Date of Patent: Nov. 26, 2002

(54) CABLE TIE WITH BENT LOCKING DEVICE AND METHOD OF MANUFACTURE THEREFOR

(75) Inventors: Jack E. Caveney, Hinsdale, IL (US); Robert J. Krisel, Oak Forest, IL (US); James A. Brownlee, Park Forest, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/858,049

(22) Filed: May 15, 2001

(51) Int. Cl.[7] .............................................. B65D 63/14
(52) U.S. Cl. ................... 24/16 PB; 24/17 AP
(58) Field of Search ............................ 24/17 AP, 16 R, 24/16 PB, 30.5 R, 30.5 P; 248/74.3; 292/318–322, 325

(56) References Cited

U.S. PATENT DOCUMENTS

| | | |
|---|---|---|
| 3,186,047 A | 6/1965 | Schwester et al. |
| 3,408,699 A | 11/1968 | Reynolds |
| 3,457,598 A | 7/1969 | Mariani |
| 3,486,200 A | 12/1969 | Orenick |
| 3,488,813 A | 1/1970 | Kohke |
| 3,490,104 A | 1/1970 | Kabel |
| 3,875,618 A * | 4/1975 | Schuplin ................... 24/17 AP |
| 3,996,646 A * | 12/1976 | Caveney ................... 24/16 PB |
| 4,498,507 A * | 2/1985 | Thomspon ................ 24/16 PB |
| 4,875,647 A | 10/1989 | Takagi et al. |
| 5,193,251 A | 3/1993 | Fortsch |
| 5,317,787 A | 6/1994 | Fortsch |
| 5,517,727 A | 5/1996 | Bernard et al. |
| 5,517,728 A | 5/1996 | Woods |
| D372,665 S | 8/1996 | Kim |
| 5,630,252 A | 5/1997 | Wells |
| 5,774,944 A | 7/1998 | Choi |
| 5,781,975 A | 7/1998 | Wells, Jr. et al. |
| 5,815,891 A | 10/1998 | Students et al. |
| 5,890,265 A | 4/1999 | Christian et al. |
| 6,076,234 A | 6/2000 | Khokhar et al. |

* cited by examiner

Primary Examiner—Robert J. Sandy
(74) Attorney, Agent, or Firm—Robert A. McCann; Jay A. Saltzman; Christopher S. Clancy

(57) ABSTRACT

A two-piece cable tie is provided that can be more readily assembled and achieves a low insertion force while maintaining desired strap retention force. The cable tie includes a metal locking device that is bent at a predetermined bend angle and then precisely located within a locking device receiving cavity. The cable tie includes a strap including a first end and a free end and a locking head secured to the first end of the strap along a strap attachment axis. The locking head includes a strap accepting channel in the head that has a strap entry end and a strap exit end on opposite ends of a strap accepting channel axis. The strap accepting channel divides the locking head into a first part and a second part, with the first part being secured to the first end of the strap and the second part including metal locking device receiving cavity adjacent to and open toward the strap exit end of the locking head and an extending wall located between the receiving cavity and the strap accepting channel. The metal locking device, which is preferably prebent, is mounted within the metal locking device receiving cavity by having a fixed end mounted to a support slot of the end wall of the locking head and oriented substantially parallel to the strap accepting channel axis. The metal locking device further includes a free end angled at an acute angle relative to the strap accepting channel axis and extending into the strap accepting channel. When mounted, the free end preferably substantially rests upon a fulcrum point of the extending wall and extends beyond the wall by a predetermined distance into the strap accepting channel.

19 Claims, 6 Drawing Sheets

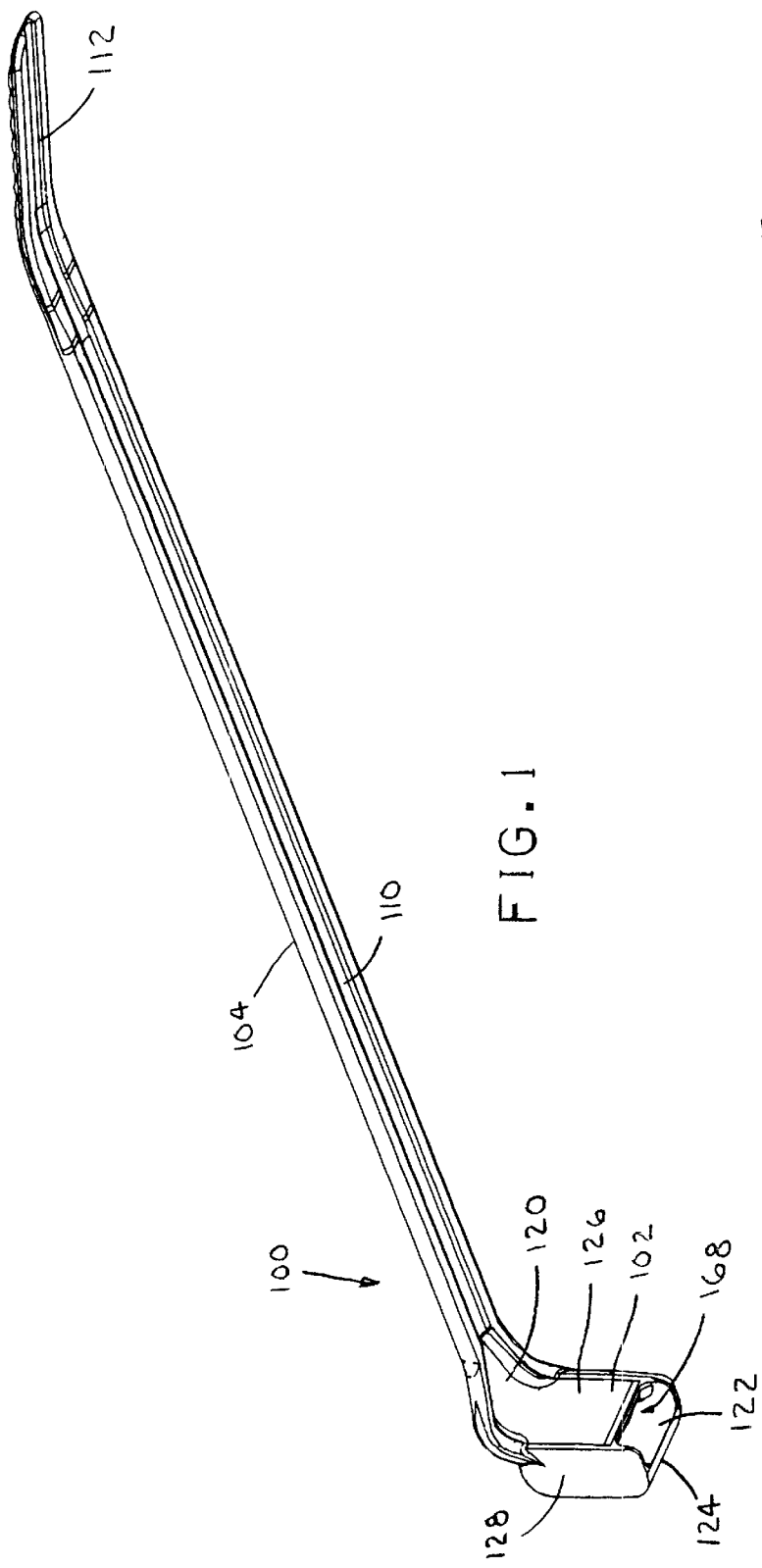
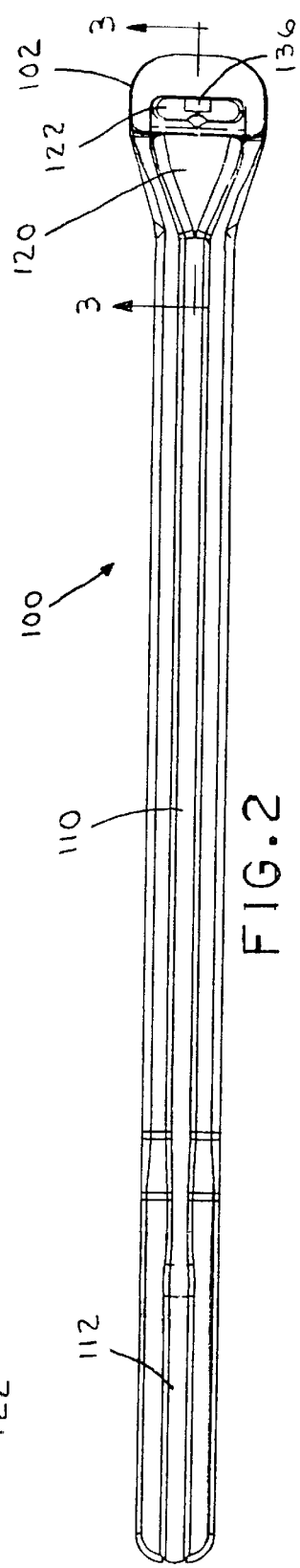

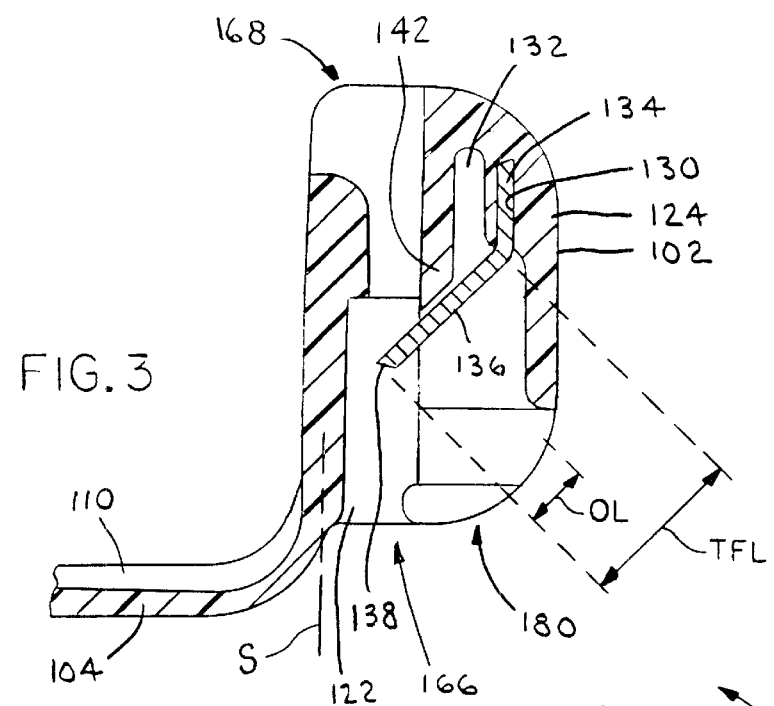
FIG. 3
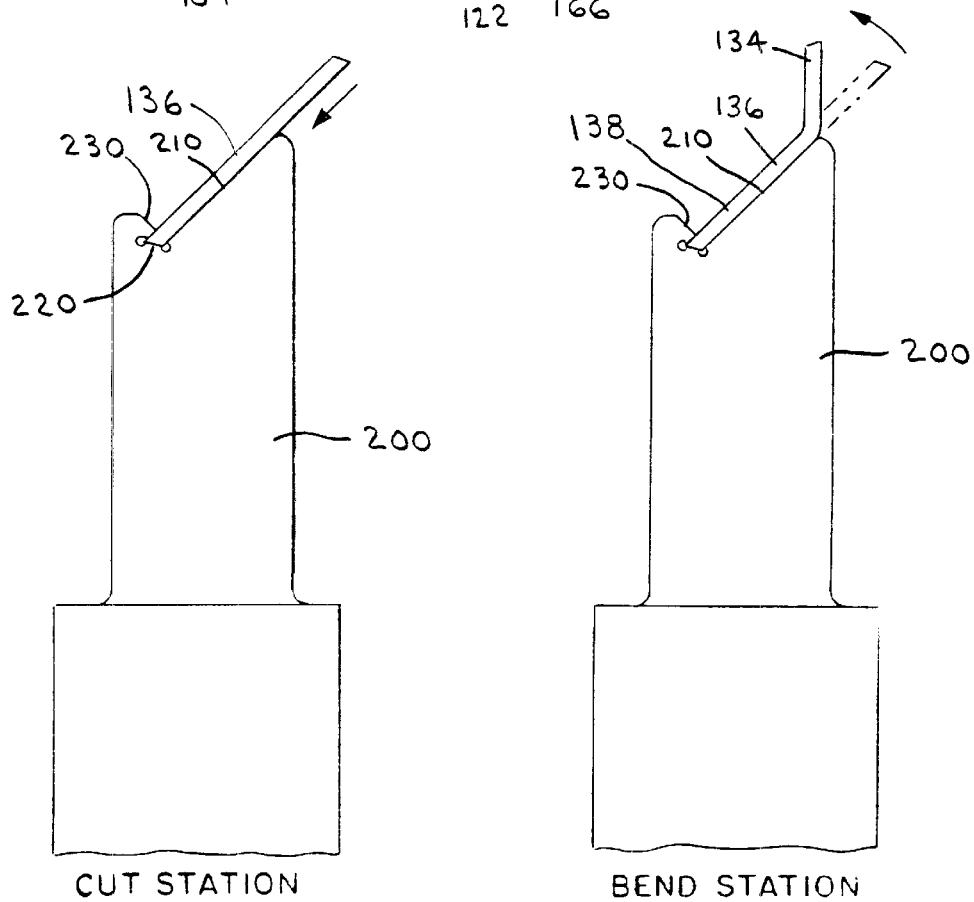
CUT STATION
FIG. 4
BEND STATION
FIG. 5

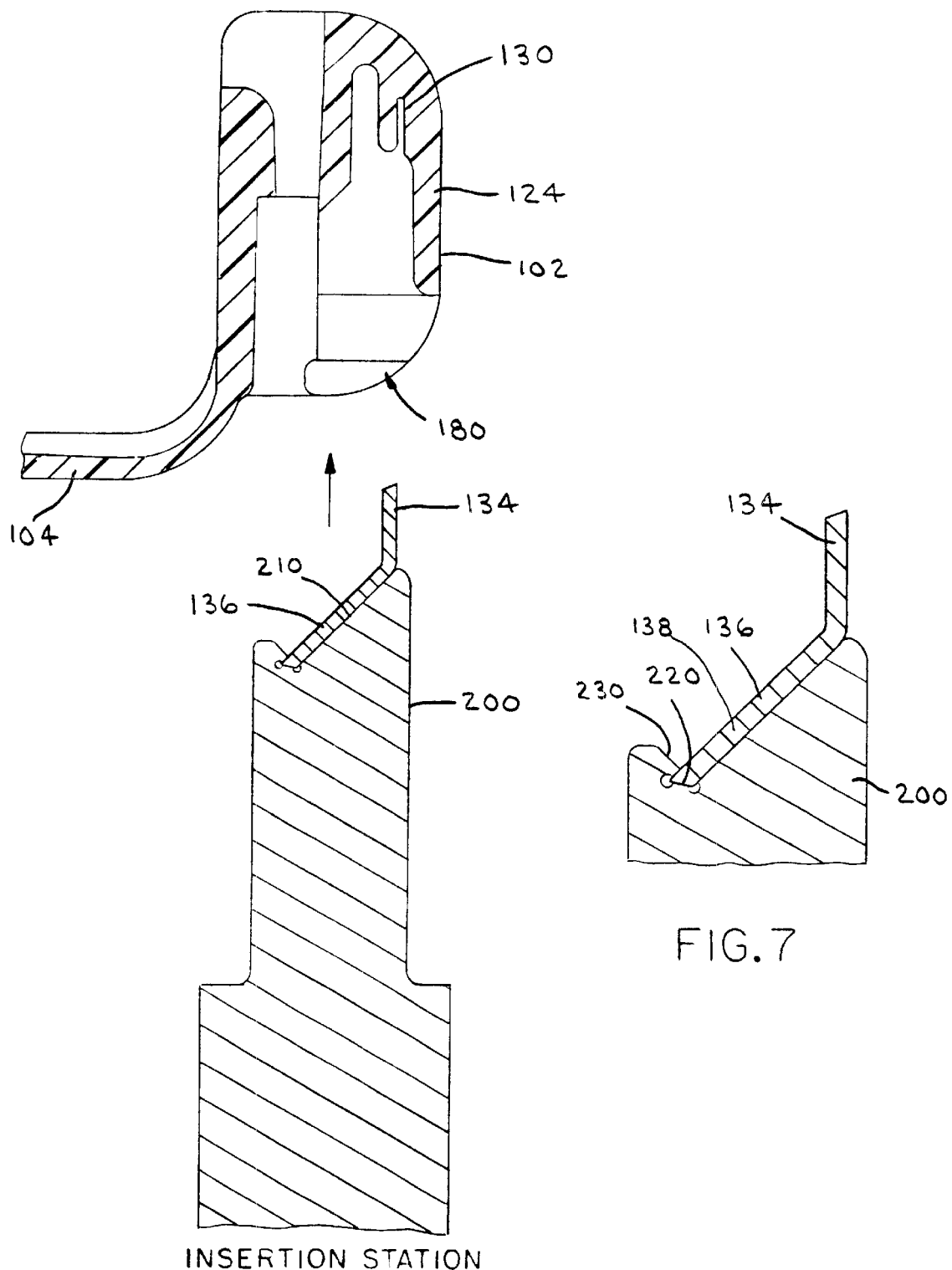

CABLE TIE WITH BENT LOCKING DEVICE AND METHOD OF MANUFACTURE THEREFOR

BACKGROUND OF THE INVENTION

1. Field of Invention

The present invention relates generally to a two piece cable tie with a preformed bent metal locking device.

2. Description of Related Art

Plastic cable ties having metal locking device inserts are well known in the art. Examples of such include U.S. Pat. No. 3,457,598 to Mariani and U.S. Pat. No. 5,517,727 to Bernard et al.

Cable ties of this type include a metal locking device partially embedded at an angle within a strap accepting channel of a cable tie head. The metal locking device is situated at an angle that allows insertion of a cable tie strap in an insertion direction, but allows for engagement of the locking device with the strap when it is pulled in a removing direction to prevent removal. The metal locking device of such conventional cable ties is in the form of a cantilevered beam that is fixed at one end and extends into the strap accepting channel at the free end.

Most of such cable ties are formed using a straight section of metal as the locking device. To achieve the desired angular relationship relative to a strap insertion channel, the straight locking device must be inserted into a metal locking device receiving cavity at an angle. However, clearances to achieve such mounting are difficult due to the minimal space provided by the strap accepting channel. Moreover, achieving a proper angular relationship within such tight constraints can be difficult to achieve.

An alternative solution can be found in U.S. Pat. No. 5,815,891 which provides a straight metal locking barb that is inserted into a locking barb receiving cavity parallel to the strap accepting channel. Then, once the locking barb has been mounted into a mounting surface of the head, the locking barb is mechanically bent to have an obtuse angle so that a sharpened free end of the locking barb is within the strap accepting channel. However, there are several difficulties with such a method of installation. First, the size of the cavity and locking barb are quite small. Achieving a desired bend angle within such constraints would be nearly impossible. Second, to achieve a desired bend angle requires overbending. That is the metal must be bent by a certain extra angular amount than a desired angle because upon release of the bending force the metal will slightly relax and elastically straighten out by a certain degree. Due to the provision of a stop member in the 891 patent bending may not occur beyond an angle where the locking barb abuts the stop member without possible damage to the stop member. However, due to the elasticity of the metal upon bending, the free end of the locking barb will straighten out by a certain amount after the bend. This leaves the free end of the locking barb located an undesired angular distance away from the stop member.

Another patent U.S. Pat. No. 5,193,251 provides a different type of cable tie with a pair of bent locking barbs. The cable tie of the 251' patent is a four-piece tie that utilizes a pair of barbs within a locking head having a pair of strap passageways that allow passage of a non-integral strap for surrounding a bundle or the like. However, the patent is silent as to how the barbs are formed. The locking head does not appear to specifically include a stop member. However, to the extent that a stop member is provided, the locking barbs are spaced by a certain substantial distance above the member so as to be freely pivotal or bendable by a certain degree. The 891 patent discusses the 251 patent briefly and alleges that the barbs in the 251 patent are prebent. Nonetheless, there is no specific teaching of how such prebending could be performed, the resulting structure or any advantages to prebending. If anything, the 891 patent's teaching of bending after insertion of the locking barb into the cavity teaches against use of prebent barbs.

There is a need for a two piece cable tie with an improved locking device structure that can be readily inserted into a cable tie locking head.

There also is a need for a two piece cable tie with a bent metal locking device that has a predetermined bend angle and is precisely located within a locking device receiving cavity.

There also is a need for a low profile two piece cable tie having a prebent metal locking device provided in a cable locking head that is oriented with a strap accepting channel parallel to a strap attachment axis.

SUMMARY OF THE INVENTION

It is an object of the invention to provide a two piece cable tie with a locking device that can be assembled more readily.

It is another object of the invention to provide a two piece cable tie with a bent locking device that can be bent at a predetermined bend angle and precisely located within a locking device receiving cavity.

It is another object of the invention to provide a cable tie having a bent locking device provided in a cable tie locking head that is oriented with a strap accepting channel parallel to a strap attachment axis.

The above and other objects are achieved by a cable tie comprising: a strap including a first end and a free end; a locking head including a strap accepting channel in the head that divides the locking head into a first part and a second part, the strap accepting channel having a strap entry end and a strap exit end on opposite ends of a strap accepting channel axis the first part of the locking head being secured to the first end of the strap along a strap attachment axis, the locking head further including a metal locking device receiving cavity adjacent to and open toward the strap exit end of the locking head and an extending wall located between the receiving cavity and the strap accepting channel; and a prebent metal locking device mounted within the metal locking device receiving cavity by having a fixed end mounted to a support slot of the end wall of the locking head and oriented substantially parallel to the strap accepting channel axis, the metal locking device further including a free end angled at an acute angle relative to the strap accepting channel axis and extending into the strap accepting channel, the free end substantially resting upon a fulcrum point of the extending wall.

The invention also provides a method of making a cable tie comprising the steps of: molding a cable tie strap with a first end and a free end and a locking head secured to the first end of the strap, the locking head including a strap accepting channel having a strap entry end and a strap exit end aligned along a strap accepting channel axis, the strap accepting channel dividing the locking head into a first part and a second part with the first end of the strap being secured to the first part, the locking head further including a metal locking device receiving cavity adjacent to and open toward the strap exit end of the locking head and an extending wall located between the receiving cavity and the strap accepting channel: forming a metal locking device, the metal locking device being formed with a fixed end and a free end that is angled at a predetermined acute angle relative to the fixed end, the free end also having a predefined total free length TFL; and inserting the metal locking device into the metal locking device receiving cavity with the fixed end being substantially parallel to the strap accepting channel axis until the fixed end is securely mounted in a slot of the locking head and the free end has a predefined overlap length OL that extends from the extending wall into the strap accepting channel.

BRIEF DESCRIPTION OF THE DRAWINGS

The foregoing and further objects, features and advantages of the present invention will become apparent from the following description of preferred embodiments with reference to the accompanying drawings, wherein:

FIG. 1 is a bottom perspective view of a cable tie according to the present invention;

FIG. 2 is a bottom view of a cable tie according to the invention;

FIG. 3 is a cross-section partial view of the cable tie of FIG. 2 taken along line 3—3;

FIG. 4 is a side view of a metal locking device holding tool positioned at a cutting station to receive a metal locking device according to the invention;

FIG. 5 is a side view of the metal locking device holding tool positioned at a bend station where the metal locking device is bent to a predetermined angle according to the invention;

FIG. 6 is a cross-sectional view of the holding tool and locking head of FIG. 5 showing internal contours and cutouts according to the invention;

FIG. 7 is an enlarged view of the free end retaining structure of the holding tool of FIG. 6;

DETAILED DESCRIPTION OF PREFERRED EMBODIMENTS

Figure 8:
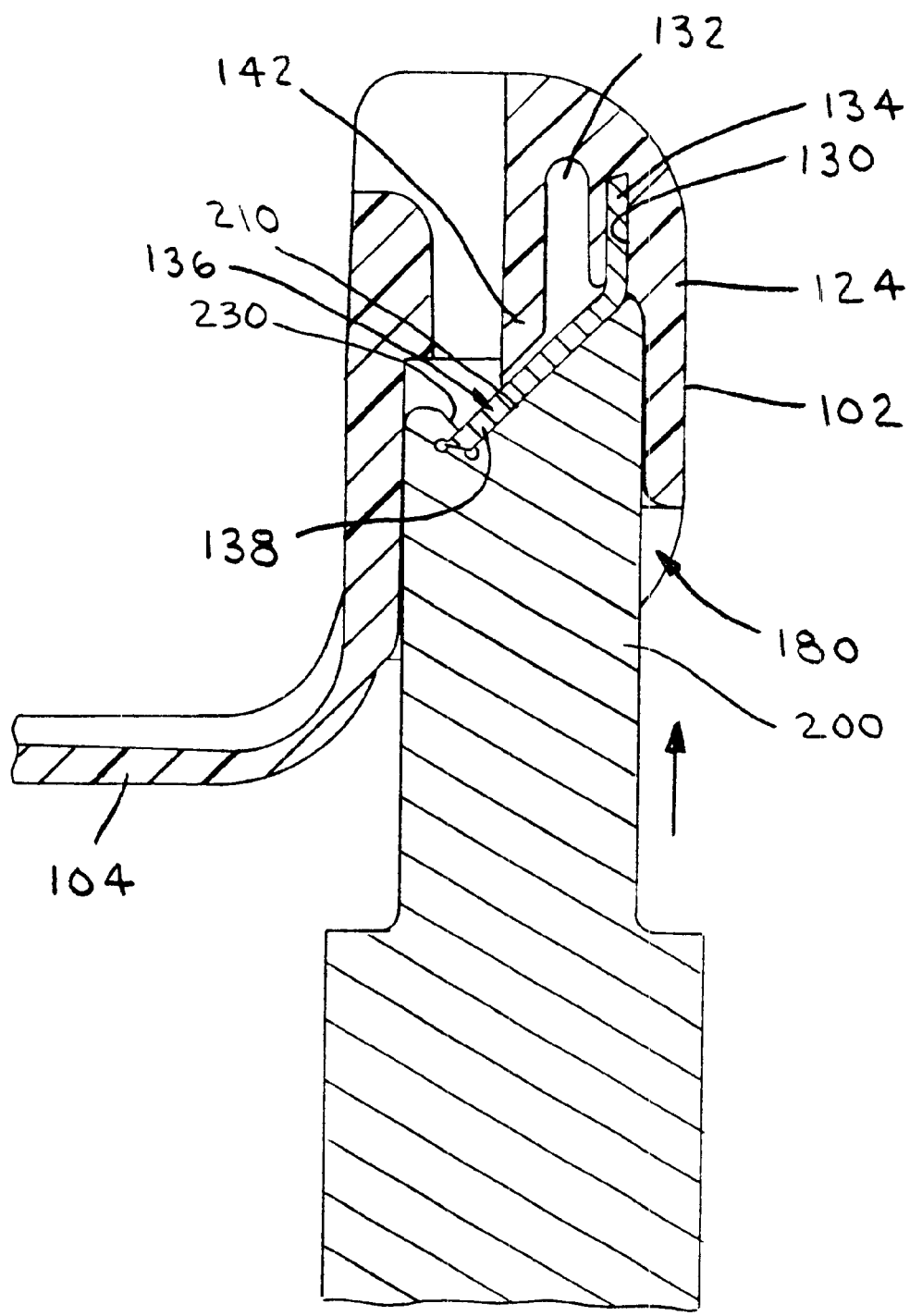
FIG. 8 is a side view of the metal locking device holding tool positioned at the insertion station after the locking device has been fully inserted into the receiving cavity according to the invention.

An inventive cable tie 100 will be described with reference to FIGS. 1–3. Cable tie 100 includes a locking head 102 and a strap 104. Cable tie 100 can be made from various materials as known in the art. Suitable materials include by way of example, nylon, polypropylene, and various fluoropolymers. Cable tie 100 can be formed in various sizes and lengths to suit a particular application as also known in the art. Obviously, desired loop tensile strength is one factor when selecting sizing of the strap, locking head and metal locking device components.

Strap 104 preferably includes an angled and tapered leading end 112 of strap 104. Strap 104 may be provided with a longitudinally extending central groove 110 on the inside surface. Central groove 110 may taper at the end of the strap adjacent locking head 102 to form an increased width, such as by providing a V-groove 120 as best shown in FIGS. 1–2.

Locking head 102 includes a strap accepting channel 122 and a locking device receiving cavity 180. Strap accepting channel 122 is sized to receive the leading end 112 of strap 104 during use. Strap accepting channel 122 has a strap entry end 168 through which strap 104 is first inserted and a strap exit end 166 (see FIG. 3). As best shown in FIG. 3, strap accepting channel 122 is formed by an end wall 124, inner wall 126, and side walls 128 (see FIG. 5). Strap accepting channel 122 has a predefined width and may be provided with a support guide 114 with ledge 116 protruding from inner wall 126. The locking device receiving cavity 180 receives metal locking device 136. Cavity 180 is provided to allow access for partial embedding of metal locking device 136 into end wall 124. A support slot 130 may be preformed in an inner surface of end wall 124 or else is inherently formed as a result of pressing fixed end 134 of metal locking device 136 into the surface of inner wall 124. The locking head 102 is also provided with an extending wall 142 that forms a fulcrum point for the metal locking device and preferably an interior wall of strap accepting channel 122 Preferably wall 142 tapers as shown to substantially match the angle of metal locking device 136. The metal locking device 136 is preferably formed from a corrosion resistant metal such as stainless steel as known in the art.

Metal locking device 136 is sized for a particular application and is prebent so that a free end 138 is at a predetermined angle relative to fixed end 134. It is also preferable for fixed end 134 to be substantially parallel to the axis of strap accepting channel 122. This allows for easier insertion of locking device 136 into cavity 180 by an insertion tool to be described later. Insertion continues until cantilevered metal locking device 136 is supported at the fulcrum point defined by extending wall 142. When installed, metal locking device 136 has a free length that allows free end 138 to extend into channel 122 by a distance to sufficiently engage strap 104 and prevent withdrawal of the strap from the channel. The free end 138 extends into strap accepting channel 122 at an acute angle relative to the axis of the channel.

Several factors determine the strap insertion force and the cable strap retention force. A primary factor is the thickness and flexibility of metal locking device 136. As most conventional metal locking devices are formed from stainless steel, the material properties can be considered a constant and the primary factor becomes the thickness. A reduction of metal thickness can have an effect on strap insertion force. However, a reduction of metal thickness also reduces cable strap retention force, which is undesirable. Another factor is the total free length TFL of metal locking device 136. The total free length TFL of metal locking device 136 is defined by the portion of locking device 136 not embedded into end wall 124. Adjustment of most of these parameters in attempts reduce insertion force are often counterproductive and result in a reduction of strap retention force. As such, it was previously considered that compromises in benefits of the two forces was necessary in a cable tie device.

One variable that can be adjusted is a weakening of the support at the fixed end of metal locking device 136. This is preferably achieved by forming a recessed pocket 132 adjacent support slot 130, between fixed end 134 and strap accepting channel 122. Recessed pocket 132 is preferably formed in the interior of locking head 102 within metal locking device receiving cavity 180. By forming recessed pocket 132 internally, the exterior surfaces of locking head 102 can remain smooth to prevent sharp molding edges and to prevent snagging of the cable tie on adjacent objects. By having an internal pocket, formation by molding can be easily achieved. More details on the recessed pocket 132 can be found in co-pending U.S. Ser. No. 09/855,261, the disclosure of which is incorporated by reference in its entirety. Recessed pocket 132 is sized to accommodate a desired deflection of fixed end 134 of metal locking device 136.

Applicants have discovered that a decrease in insertion force without a loss in loop tensile strength or retention force can be achieved by insertion of the prebent metal locking device 136 into cavity 180 until free end 138 substantially rests on fulcrum point 142. Upon insertion of the strap 104, metal locking device is able to be easily deflected upwards toward exit end 166 due to the non-restriction in this direction and the ability of the fixed end 134 to slightly move due to the recessed pocket 132. However, when forces are applied to remove the strap toward strap entry end 168, free end 138 flexes downward slightly until it fully rests upon and is supported by fulcrum point 142. This shortens the effective free length of the metal locking device 136 to an overlap length OL that provides increased resistance to flexure without having to increase thickness of the metal locking device to achieve a similar resistance with the original total free length TFL. The overlap length OL being defined by the portion of free end 138 of metal locking device 136 extending beyond the fulcrum point 142. As such, a locking device structure can be provided that has a low thread insertion force while retaining or improving strap retention force.

While cable tie 100 is shown to have a locking head with a strap accepting channel parallel to a strap attachment axis S and a strap that is bent at approximately 90° from strap axis S, the cable tie is not limited to such a configuration and may take other forms. For example, the cable tie 100 may have a straight strap that extends substantially along axis S. Additionally, cable tie 100 may have a more conventional right angle locking head such as that shown in Bernard et al. +727 that has a strap accepting channel at a right angle to strap axis S.

Formation of the two piece cable tie will be described with reference to FIGS. 4–10 FIG. 4 shows a discrete metal locking device 136 cut from a supply of metal by suitable and known cutting devices. The cut metal locking device 136, which is still straight at this time, is placed into a tool 200 at the cutting station. Tool 200 as better shown in FIG. 7 has an angled support surface 210, an end support 220 that supports a tapered end (free end 138) of the metal locking device, and an overextending support edge 230 that overextends the fixed end of locking device 136 to allow retention of the locking device 136 on tool 200. Preferably, a radiused corner relief 225 is provided on surface 220 to protect the edge of locking device 136.

From the cutting station in FIG. 4, tool 200 advances the cut locking device 136 to a bending station as shown in FIG. 5. Here, an unshown bending device bends the locking device 136 to a desired bend angle. Any of many conventional or subsequently developed bending devices can be used. The importance of this step is in the prebending of the device 136 outside of the confines of the cable tie head, which allows for easier bending, as well as improved bend control accuracy. Bending fixtures can be used that provide a bend at a specific location and allow for the overbending of the barb so that it will spring back to the desired angle. Upon completion of the bending, locking device 136 will have a precise desirable angle as shown.

Figure 9:
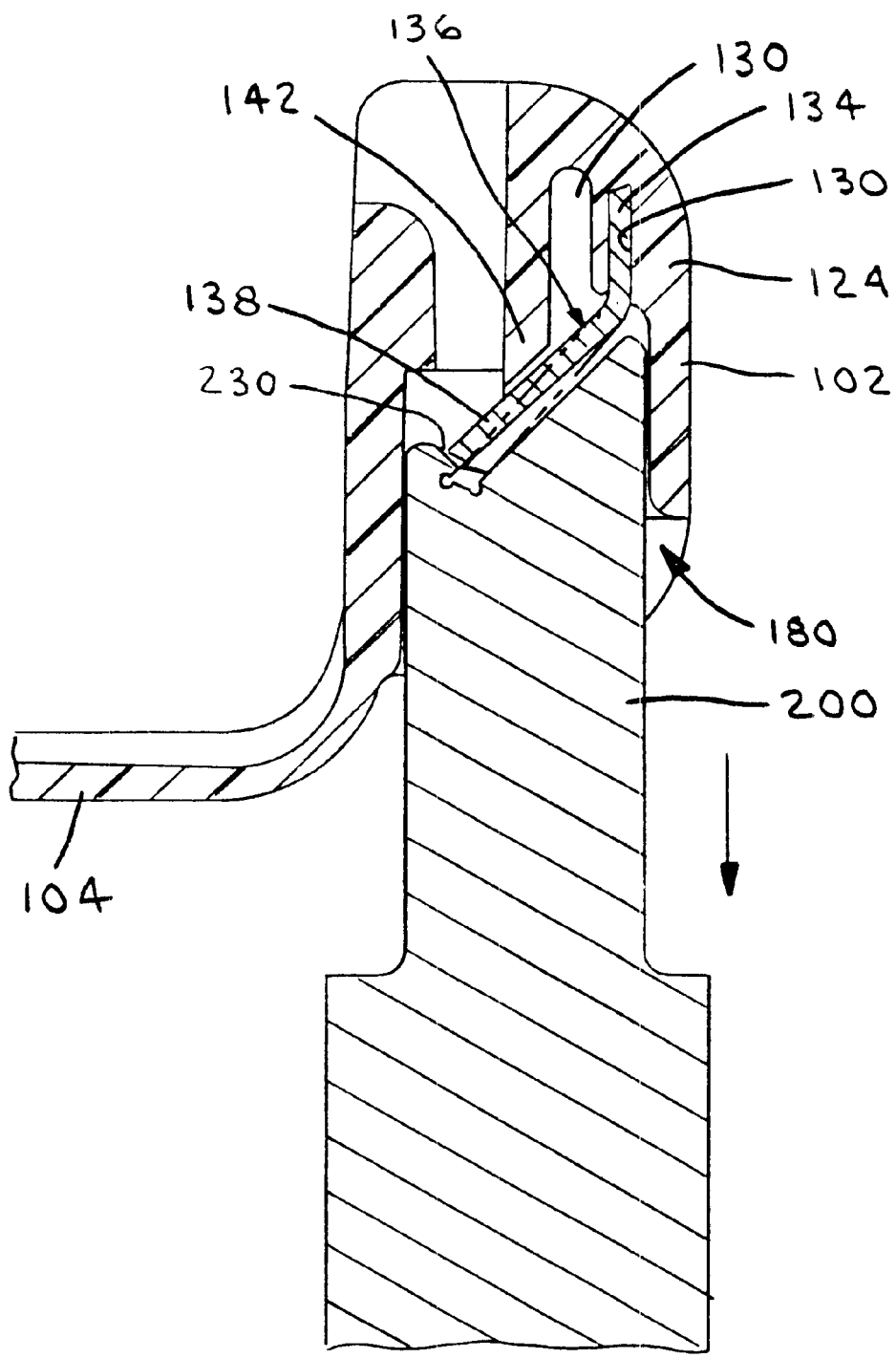
FIG. 9 is a side view of the metal locking device holding tool positioned at an insertion station after the holding tool has been partially retracted from the locking head according to the invention.
Figure 10:
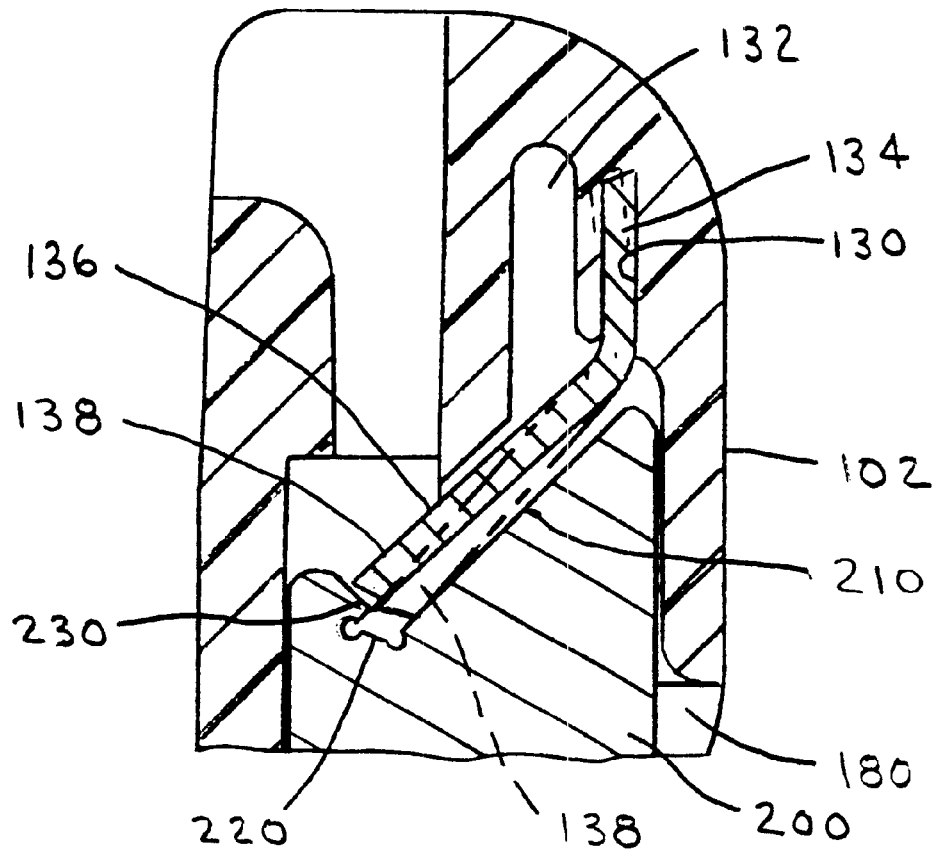
FIG. 10 is an enlarged partial view of FIG. 9.

From the bending station, tool 200 is positioned at an insertion station (FIGS. 6–7). At this station, tool 200 is aligned with cable tie head 102 and advanced into cavity 180 (FIG. 8) until fixed end 134 of metal locking device 136 is inserted into end wall 124 with or without slot 130 until sufficiently seated and until free end 138 is sufficiently resting on or immediately adjacent fulcrum point 142 as shown. After full insertion, tool 200 is withdrawn (FIG. 9). As the tool is withdrawn, free end 138 flexes to the position shown in dashed outline until such time that free end 138 clears overextending support edge 230, at which time free end springs back to the position shown in solid form resting upon or immediately adjacent fulcrum point 142. This forms a resultant two-piece cable tie as best shown in FIG. 3.

In summary, with the inventive two-piece cable tie, an easy installation can be achieved by using a prebent metal locking device that can be inserted into cavity 180 at a straight angle relative to the strap accepting channel. This overcomes problems with conventional two-piece cable ties that use a straight metal locking device that must be inserted at an angle relative to the strap accepting channel, which has caused great design and installation problems. Moreover, as the inventive locking device is prebent outside of the cavity, a simpler and more accurate bending can be achieved. Also, when bending a metal, it is necessary to overbend the metal by a certain angular degree as the metal upon release of the bending force will relax or spring-back by a determinable amount. By forming the locking device outside of the cable tie head, there is room for this overbending. This is particularly critical in this particular application as the desired final placement of the metal locking device is with the free end 138 resting upon the fulcrum point. This placement cannot be achieved with in-cavity bending as either 1) the bending will be limited by a stop member and the result will be a locking device that is substantially removed from the stop member once the locking device springs back, or 2) the bending must be achieved in a cavity that does not include a stop member.

Furthermore, by use of the prebent locking device, the device can have a precisely located bend with a desired angular configuration and the free end either resting on or being immediately adjacent the fulcrum point, which assists in maintaining or increasing cable retention force.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A cable tie, comprising:
   a strap including a first end and a free end;
   a locking head including a strap accepting channel in the head that divides the locking head into a first part and a second part, the strap accepting channel having a strap entry end and a strap exit end on opposite ends of a strap accepting channel axis, the first part of the locking head being secured to the first end of the strap along a strap attachment axis, the locking head further including a metal locking device receiving cavity adjacent to and open toward the strap exit end of the locking head and an extending wall located between the receiving cavity and the strap accepting channel; and
   a prebent metal locking device mounted within the metal locking device receiving cavity by having a fixed end mounted to the end wall of the locking head and oriented substantially parallel to the strap accepting channel axis, the metal locking device further including a free end angled at an acute angle relative to the strap accepting channel axis and extending into the strap accepting channel, the free end substantially resting upon a fulcrum point of the extending wall.

2. The cable tie of claim 1, wherein the fulcrum point of the extending wall is tapered to substantially match the angle of the free end of the metal locking device.

3. The cable tie of claim 1, wherein the receiving cavity is substantially parallel to the strap accepting channel axis.

4. The cable tie of claim 1, wherein the free end extends into the strap accepting channel by a predefined amount.

5. The cable tie of claim 1, wherein the metal locking device is formed from stainless steel.

6. The cable tie of claim 1, wherein the strap accepting channel is parallel to the strap attachment axis.

7. The cable tie of claim 1, wherein the prebent metal locking device is mounted in the second part.

8. A method of making a cable tie, comprising the steps of:

molding a cable tie strap with a first end and a free end and a locking head integrally connected to the first end of the strap, the locking head including a strap accepting channel having a strap entry end and a strap exit end aligned along a strap accepting channel axis, the locking head further including a metal locking device receiving cavity adjacent to and open toward the strap exit end of the locking head and an extending wall located between the receiving cavity and the strap accepting channel;

forming a metal locking device outside of the locking head by cutting a length of straight metal and bending the metal to achieve a prebent shape, the metal locking device being formed with a fixed end and a free end that is angled at a predetermined acute angle relative to the fixed end, the free end also having a predefined total free length TFL; and inserting the metal locking device into the metal locking device receiving cavity with the fixed end being substantially parallel to the strap accepting channel axis until the fixed end is securely mounted in a slot of the locking head and the free end has a predefined overlap length OL that extends from the extending wall into the strap accepting channel.

9. The method of claim 8, wherein the step of bending occurs while the metal is retained on an insertion tool.

10. The method of claim 8, wherein the prebent metal locking device is retained on the insertion tool and the step of inserting is achieved by inserting the insertion tool carrying the metal locking device into the receiving cavity of the locking head.

11. The method of claim 8, wherein the strap accepting channel divides the locking head into a first part and a second part with the first end of the strap being secured to the first part and the metal locking device receiving cavity located in the second part.

12. The method of claim 8, wherein the metal locking device is preformed in the bent shape prior to insertion into the metal locking device receiving cavity.

13. The method of claim 12, wherein the step of forming a locking head forms the extending wall with a tapered fulcrum point that substantially matches the angle of the metal locking device.

14. The method of claim 13, wherein the step of inserting the metal locking device includes inserting the metal locking device until the free end is substantially resting upon the fulcrum point of the extending wall of the locking head.

15. A cable tie, comprising:

a strap including a first end and a free end;

a locking head including a strap accepting channel in the head that divides the locking head into a first part and a second part, the strap accepting channel having a strap entry end and a strap exit end on opposite ends of a strap accepting channel axis, the first part of the locking head being secured to the first end of the strap along a strap attachment axis, the locking head further including a metal locking device receiving cavity located on the second part adjacent to and open toward the strap exit end of the locking head and an extending wall located between the receiving cavity and the strap accepting channel; and a metal locking device mounted within the metal locking device receiving cavity by having a fixed end mounted to a support slot of the end wall of the locking head and oriented substantially parallel to the strap accepting channel axis, the metal locking device further including a free end angled at an acute angle relative to the strap accepting channel axis and extending into the strap accepting channel.

16. The cable tie of claim 15, wherein the extending wall has a fulcrum point tapered to substantially match the angle of the free end of the metal locking device.

17. The cable tie of claim 15, wherein the receiving cavity is substantially parallel to the strap accepting channel axis.

18. The cable tie of claim 15, wherein the strap accepting channel is parallel to the strap attachment axis.

19. A method of making a cable tie, comprising the steps of:

molding a cable tie strap with a first end and a free end and a locking head integrally connected to the first end of the strap, the locking head including a strap accepting channel having a strap entry end and a strap exit end aligned along a strap accepting channel axis, the locking head further including a metal locking device receiving cavity adjacent to and open toward the strap exit end of the locking head and an extending wall located between the receiving cavity and the strap accepting channel, the strap accepting channel divides the locking head into a first part and a second part with the first end of the strap being secured to the first part and the metal locking device receiving cavity located in the second part;

forming a metal locking device, outside of the locking head the metal locking device being formed with a fixed end and a free end that is angled at a predetermined acute angle relative to the fixed end, the free end also having a predefined total free length TFL; and inserting the metal locking device into the metal locking device receiving cavity with the fixed end being substantially parallel to the strap accepting channel axis until the fixed end is securely mounted in a slot of the locking head and the free end has a predefined overlap length OL that extends from the extending wall into the strap accepting channel.

* * * * *